United States Patent [19]
Denz et al.

[11] Patent Number: 5,583,383
[45] Date of Patent: Dec. 10, 1996

[54] VEHICLE SECURITY SYSTEM

[75] Inventors: Helmut Denz, Stuttgart; Juergen Pischke, Weissach; Werner Fischer, Heimbsheim; Johannes D. Wichterich, Muehlacker; Helmut Randoll, Vahingen; Wilfried Burger, Hemmingen; Martin Laichinger, Ebersbach; Reinhard Gantenbein, Sersheim; Bernd Diebold, Rheinau; Michael Tochtermann, Ingersheim, all of Germany

[73] Assignee: Robert Bosch GmbH, Stuttgart, Germany

[21] Appl. No.: 279,977

[22] Filed: Jul. 25, 1994

[30] Foreign Application Priority Data

Oct. 29, 1993 [DE] Germany .......................... 43 36 938.3
Apr. 27, 1994 [DE] Germany .......................... 44 14 644.2

[51] Int. Cl.$^6$ .................................................. G06F 15/20
[52] U.S. Cl. ...................... 307/10.2; 307/10.4; 307/10.5; 364/424.04
[58] Field of Search ........................ 307/9.1, 10.1, 307/10.2, 10.3, 10.4, 10.5, 10.6, 10.7, 10.8; 361/171; 340/425.5, 426, 534, 825.31, 825.34; 180/287; 123/198 B, 198 DB, 198 DC; 364/424.01, 424.03, 424.04, 424.05

[56] References Cited

U.S. PATENT DOCUMENTS

| | | | |
|---|---|---|---|
| 3,634,880 | 1/1972 | Hawkins | 307/10.5 |
| 5,079,435 | 1/1992 | Tanaka | 307/10.2 |
| 5,091,856 | 2/1992 | Hasegawa | 364/424.05 |
| 5,111,185 | 5/1992 | Kozaki | 340/825.31 |
| 5,172,062 | 12/1992 | Eisermann | 364/424.04 |
| 5,404,300 | 4/1995 | Sugiura | 364/424.05 |
| 5,418,721 | 5/1995 | Arai | 364/424.04 |
| 5,459,660 | 10/1995 | Berra | 364/424.03 |
| 5,523,948 | 6/1996 | Adrain | 364/424.01 |

FOREIGN PATENT DOCUMENTS

| | | |
|---|---|---|
| 0231607 | 8/1987 | European Pat. Off. . |
| 0303059 | 2/1989 | European Pat. Off. . |
| 0372741 | 6/1990 | European Pat. Off. . |
| 2613993 | 10/1988 | France . |
| 2051442 | 1/1981 | United Kingdom . |
| 89/07815 | 8/1989 | WIPO . |
| WO93/05987 | 4/1993 | WIPO . |
| 93/20490 | 10/1993 | WIPO . |

*Primary Examiner*—William M. Shoop, Jr.
*Assistant Examiner*—Peter Ganjoo
*Attorney, Agent, or Firm*—Spencer & Frank

[57] ABSTRACT

A vehicle security system with an anti-theft controller which conducts a data exchange with at least one function controller, particularly an engine controller, in order to control its operational readiness, wherein the data exchange is conducted via a data line connecting at least the anti-theft controller and the function controller. Alternatively, an external device (4) can be connected to the data line (1), with the device being configured for the exchange of data with at least one of the controllers (2, 3, 3', 3") The data line is a line which is already in existence in the vehicle, particularly a K-diagnostics line and/or an L-diagnostics line in accordance with ISO standard 9141. For the control of the data exchange, one of the controllers (2, 3) connected via the data line (1) exercises the functions of the control unit. If an external device (4) is connected to the data line (1, 1'), the external device assumes the function of the control unit from the controller (2, 3) controlling the data exchange in order to conduct the data exchange with the controllers (2, 3, 3', 3") connected via the data line (1).

8 Claims, 8 Drawing Sheets

VEHICLE SECURITY SYSTEM

BACKGROUND OF THE INVENTION

The invention is based on a security system for a vehicle of the generic type having an anti-theft controller which conducts a data exchange with at least one function controller, particularly an engine controller, in order to control its operational readiness and having a data line which connects at least the anti-theft controller and the function controller and through which the data exchange is carried out. A known system of this type (WO 93/05 987) consists of a starting device with a code carrier and a device for reading the code carrier, a data bus connected to the reading device as well as of a plurality of units connected to the data bus for the control of vehicle functions. In order to ready the latter for operation, the reading unit sends them a code signal which it compares to a previously stored reference code. If at least for one function controller the code received by the reading unit and the previously stored reference code do not agree, the function controller sends an error signal via the data bus, with the signal leading to the immobilization of the vehicle, depending on the importance of the respective unit for the vehicle functions. If a thief wanted to bypass this known system by means of an own reading unit and own function controllers, he would have to replace all of the existing units. Because of the high expenditure connected to this, the known system offers a high degree of protection against vehicle theft. The implementation of the described system, however, departed from a vehicle bus that includes all electronic components. But especially vehicles in operation today do not yet have such a bus. The usefulness of such a bus for diagnosing the connected units is also limited because the evaluation of all diagnostic messages must always presuppose that the bus itself is working properly. A diagnosis of the state of the bus itself is not provided for.

SUMMARY OF THE INVENTION

It is the object of the present invention to provide a vehicle security system which, while ensuring equal protection against unauthorized use, offers a hardware structure that is as simple as possible and which can be used easily in its entirety or with which existing vehicles can be retrofitted to improve already existing security systems.

The above object is achieved according to the present invention by a system. A security system provided with the characterizing features of claim 1 offers the advantage that, apart from its designated use as a vehicle security system, it can also be used for other purposes. Such purposes comprise, e.g., vehicle diagnostics with an external engine tester or the implementation of new software in a function controller by means of an application device. Owing to the multiple use, a separate line system which normally exists for these purposes can be deleted.

A further improved protection against software manipulation is offered by a security system having according to the invention the above features 1) and wherein the anti-theft controller, after recognizing the connection of an external device to the data line, stores a signal on the basis of which it is possible to subsequently start the vehicle at least once without conducting a data exchange for an authorization check. The advantage of the proposed data exchange for an authorization check is, in particular, that the rule on the basis of which the receiving device forms a derivative code from the base code received can be predetermined arbitrarily. The rule itself can also be variable, e.g., as a function of the base code.

Furthermore, it is also advantageous to configure a security system according to the invention as described above so that one of the controllers connected via the data line exercises the function of the control unit to conduct the data exchange. To the extent that a vehicle has first been unlocked correctly, it may thus still be taken into operation, e.g., even if the anti-theft controller is defective and unlocking is therefore no longer possible.

A security system according to the invention configured according to a combination of the features 1) and/or 2) and/or 3) described above is particularly advantageous. With advantageous multiple use of an individual data line system it offers a high degree of protection against unauthorized use of the vehicle but permits authorized use even in cases of certain errors.

Advantageous modifications and useful developments of the security system according to the invention are proposed in the dependent claims.

A security system according to the invention configured according to the combination of features 1) above and wherein a line already in existence in the vehicle serves as data line. characterizing feature of claim 2 takes advantage of the fact that, in many vehicles, a data line system for diagnostic purposes is already in existence. According to the invention, this existing line system is now used for vehicle security whenever it is not used for diagnostic purposes. Since only a few additional hardware components are needed, such a system has the advantage that it can easily be used to retrofit existing vehicles. The installation expenditure required for this purpose is low, in particular, the installation of additional lines is eliminated.

During normal vehicle operation, the control of the data line system lies with the anti-theft controller. Alternatively, it may also lie with a function controller. This is useful, in particular, if only one single function controller, especially the engine controller, is integrated into the function of the vehicle security system but no additional controllers.

If an external device, especially an engine tester, is connected to the line system for diagnostic purposes, it assumes the control of data communications on the data line system. The data line system has a standardized impedance which should not be changed even when an external device is connected. Therefore, the changeover between driving and diagnostic mode is suitably effected by a switch disposed in the anti-theft controller, with the switch, after recognizing the connection of an external device to the line system, releasing a low-resistance control connection between line system and battery voltage arranged in the anti-theft controller.

In order to avoid communication conflicts, an unlimited data exchange between an external device and the function controllers or the anti-theft controller only takes place if all controllers have first been unlocked correctly in a predetermined manner.

For instance, in order to be able to log in, e.g., a cold start during a vehicle inspection with a tester being connected, it is useful, in case a tester has been connected, to allow the vehicle to be started up at least once without checking the authorization of the user. By limiting such start-ups without authorization to one time or a few times, vehicle manipulations by means of a tester for the purpose of stealing the vehicle are effectively prevented.

Advantageously, the function controllers are unlocked in such a manner that, at first, they are operational in principle and are only locked if a code indicating the authorization of the user does not appear. This allows the user to start the vehicle comfortably and without starting delay.

Advantageously, a data exchange is carried out cyclically during the operation of the vehicle or after the ignition has been turned off during a self-holding phase of the function controllers in order to monitor the data line between central controller and function controllers. If an error occurs during the operation, an error message is advisably produced which is filed in a permanent memory to be read out later.

In order to allow an emergency operation in case of an interruption of the data line after the vehicle has been turned off, it is useful either to permit operation for a determinable number of follow-up starts without another unlocking data exchange, if unlocking has first taken place correctly, or to provide for the possibility of inputting a code in a different manner than via the code carrier provided for this purpose, which results in the unlocking of the controllers, e.g., by activating the gas pedal. The following explains an embodiment of the invention in greater detail based on the drawing.

BRIEF DESCRIPTION OF THE DRAWING

According to FIG. 2 the invention shows an implementation of the circuitry for the addition of an external device to the vehicle security system of FIG. 1.

FIG. 3 (consisting of FIGS. 3a and 3b taken together, the same being joined at the points indicated by the encircled "A" shown in the respective Figures) shows the function of the central anti-theft controller in the form of a flow chart.

DETAILED DESCRIPTION OF THE EMBODIMENTS

Figure 1:
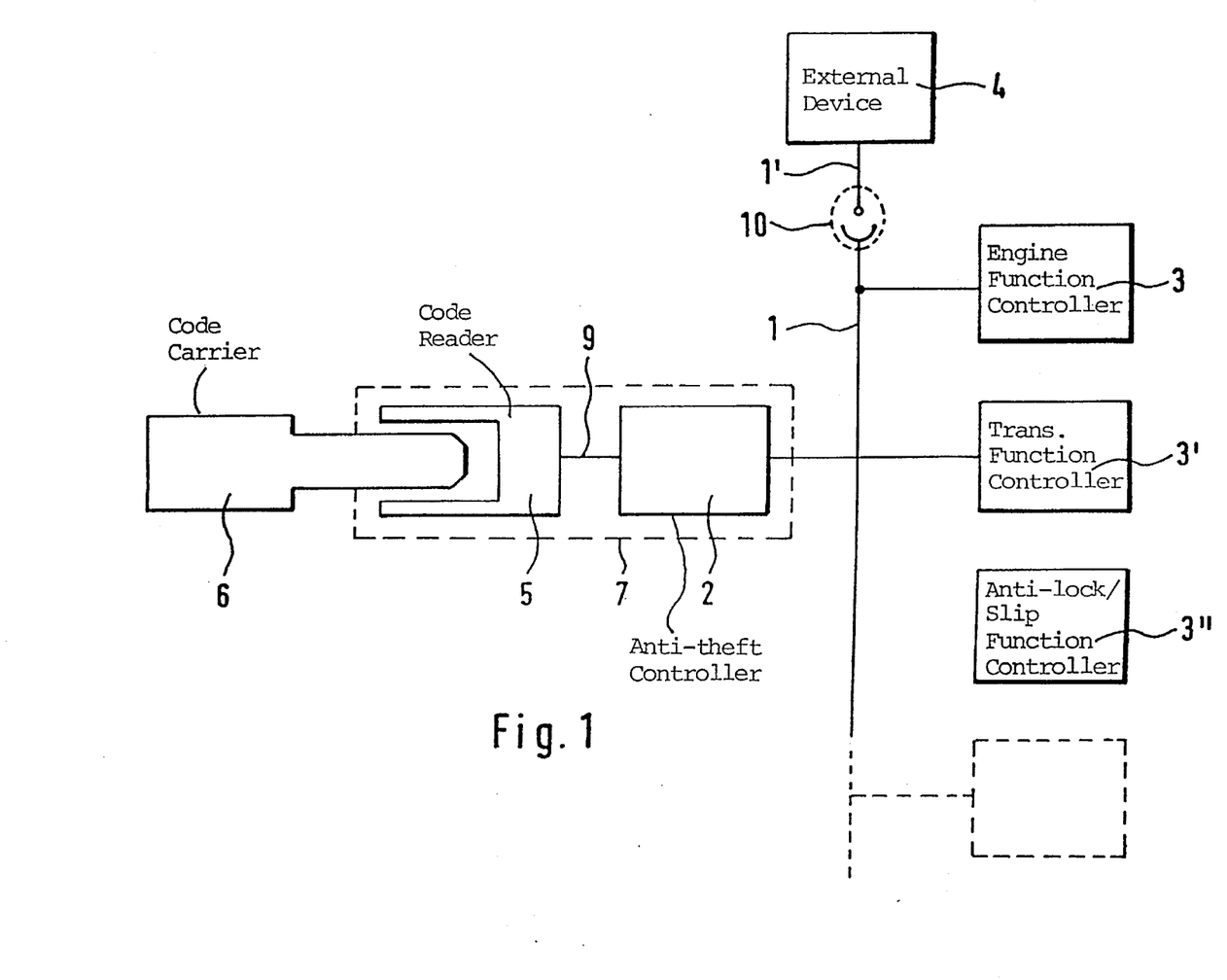
FIG. 1 is a basic block diagram of a vehicle security system.

FIG. 1 shows the main components of a vehicle security system.

A code carrier 6, e.g., a coded card, an infrared transmitter or a key with transponder, and a code reading unit 5 form a start-up arrangement. It is usually disposed in the interior of the vehicle. A central anti-theft controller 2 (DSS) for the control and monitoring of the functions of the vehicle security system is connected to the reading unit 5, in FIG. 1 via a line 9. Advisably, the anti-theft controller 2 and the reading unit 5 may also be arranged together in a control assembly 7. A plurality of function controllers 3, 3', 3" for the control of engine or other vehicle functions is connected to the anti-theft controller 2 via a data line 1. All function controllers 3, 3', 3" as well as the central anti-theft controller 2 are each provided with at least one integrated circuit 29, 39, 39', 49 that processes digital signals, particularly in the form of a microprocessor or an application-specific integrated circuit (ASIC), which, on the one hand, serves to effect communications with the other controllers, including the anti-theft controller, and, on the other hand, executes respective device-specific functions, i.e., in the case of the engine controller determining the amount of fuel to be injected, controlling the ignition, etc. In addition to the afore-mentioned engine controller, further controllers of this type are, e.g., a transmission control unit 3' or an anti-lock/anti-slip control system 3". If several controllers are present, as is assumed in FIG. 1, one of them, usually the engine controller 3, advisably communicates with the anti-theft controller 2, while the further controllers 3', 3" that are connected to the data line 1, do not take this communication into account. It is equally possible that yet another or several of the further controllers 3', 3" also communicate with the anti-theft controller 2 within the context of unlocking/locking of the vehicle Here, the "master function", i. e., the control of communications, advisably lies with the anti-theft controller 2. If the communication for starting the vehicle only takes place between the anti-theft controller 2 and one single function controller 3, as is assumed in the following, it may, however, also be useful for the function controller 3 to assume the master function in order to increase operational reliability.

In the following, the controller communicating with the anti-theft controller is generally called the function controller 3. At an arbitrary point, advisably selected on the basis of accessibility criteria, the data line 1 is provided with an interface 10, in a simple manner in the form of a plug, for the connection of an external device 4. Such a device may be, in particular, a tester for diagnosing the controllers 2, 3, 3', 3", or an application device implementing new software into the controllers 2, 3, 3', 3". Advisably, the external device 4 is connected to the plug 10 via a data line 1' which is the continuation of the vehicle-based data line 1. The diagnostic line in accordance with ISO standard 9141, which is already contained in numerous vehicles, is particularly preferred to serve as the vehicle-based data line 1. Physically, it consists either of a single line, the so-called K-line, or a line pair, a K-line and an L-line. The anti-theft controller 2 is also connected to the existing diagnostic line which is in compliance with ISO standard 9141.

Figure 2:
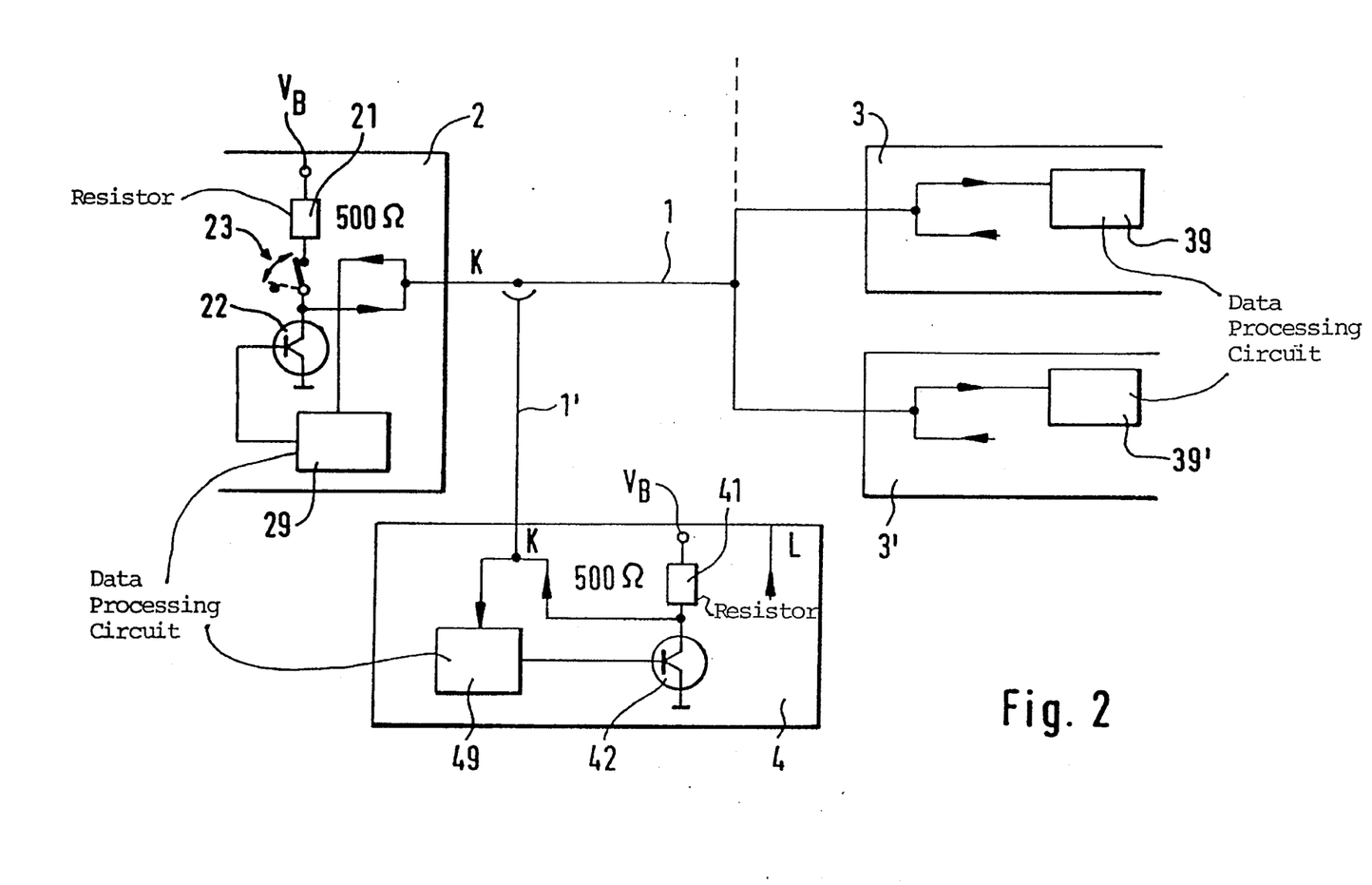

FIG. 2 shows the manner in which the anti-theft controller 2 and an external device 4 can be connected to the data line 1 at the same time if an existing K-line is used as data line 1. In order to be able to feed digital signals to the data line 1, the anti-theft controller 2 as well as the external device 4 each are provided with a series connection consisting of a resistor 21 or 41, whose value in FIG. 2 amounts to 500 Ohm in accordance with ISO standard 9141, as well as of switching means 22 or 42, usually in the form of transistors, the series connection being arranged between the potential of the vehicle battery voltage Us and ground. The switching means 22, 42 are respectively actuated by circuit 29, 49 processing digital signals provided in the associated controller 2, 4. Depending on the switching state, a "high" or a "low" level is applied to data line 1, 1'. In addition, the series connection 21, 22 of the anti-theft controller 2, is also provided with a switch 23 which allows separation from the battery voltage $U_B$. The electronic configuration indicated in FIG. 2 can, of course, also be utilized for implementations that are not based on the use of the K-line or the K- and L-diagnostic line.

In the following, the function of the arrangement shown in FIGS. 1 and 2 is explained. The communication for vehicle security takes places between the anti-theft controller 2 and the function controller 3, usually the engine controller. In the embodiment, further controllers 3', 3" that may possibly be connected to the data line 1 are not to be included in the communication. The anti-theft controller 2 controls the communication.

The sequence of a use of the proposed vehicle security system according to the invention is shown in FIGS. 3 to 6 in the form of flow charts.

Figure 3A:
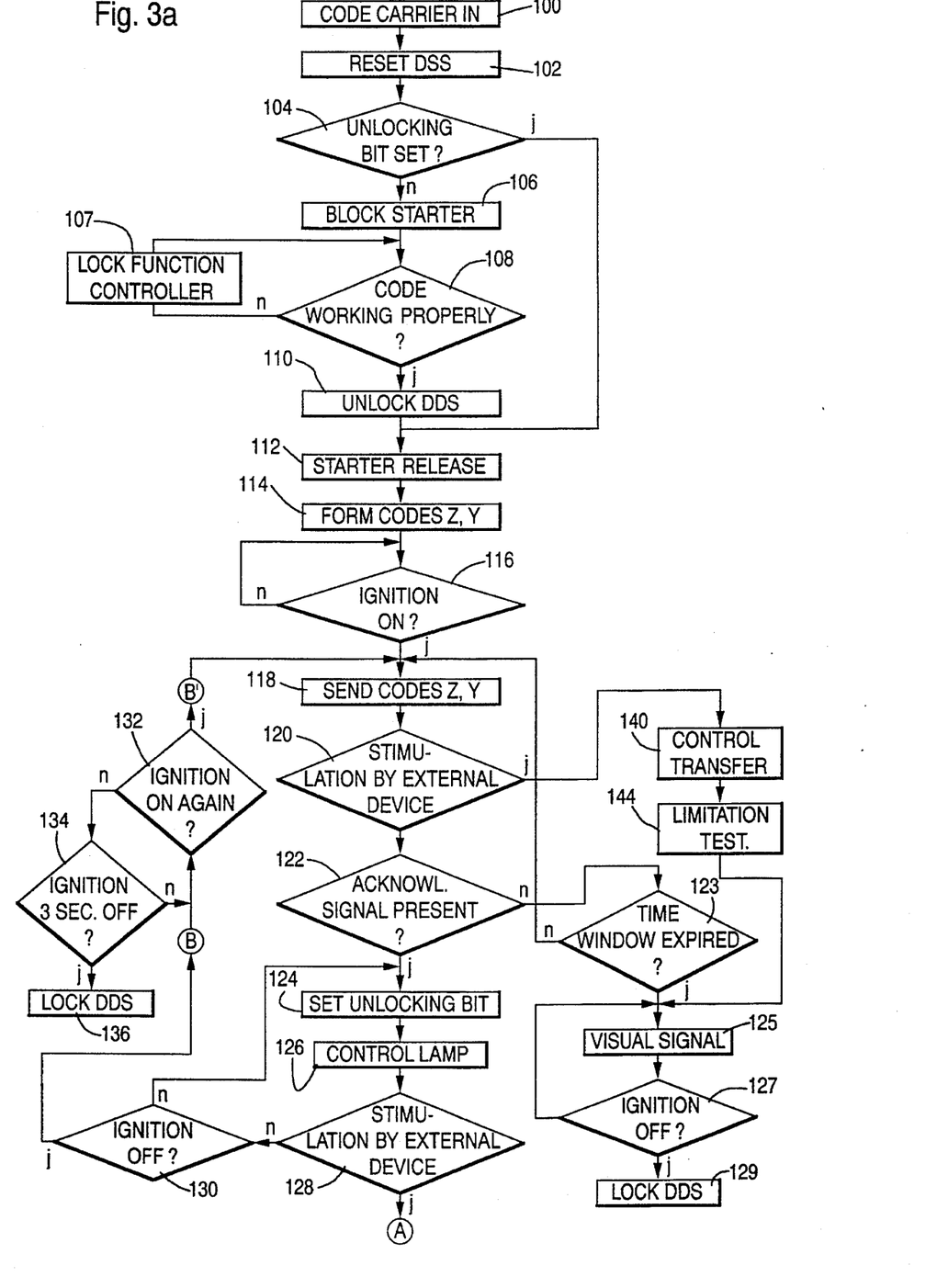
Figure 3B:
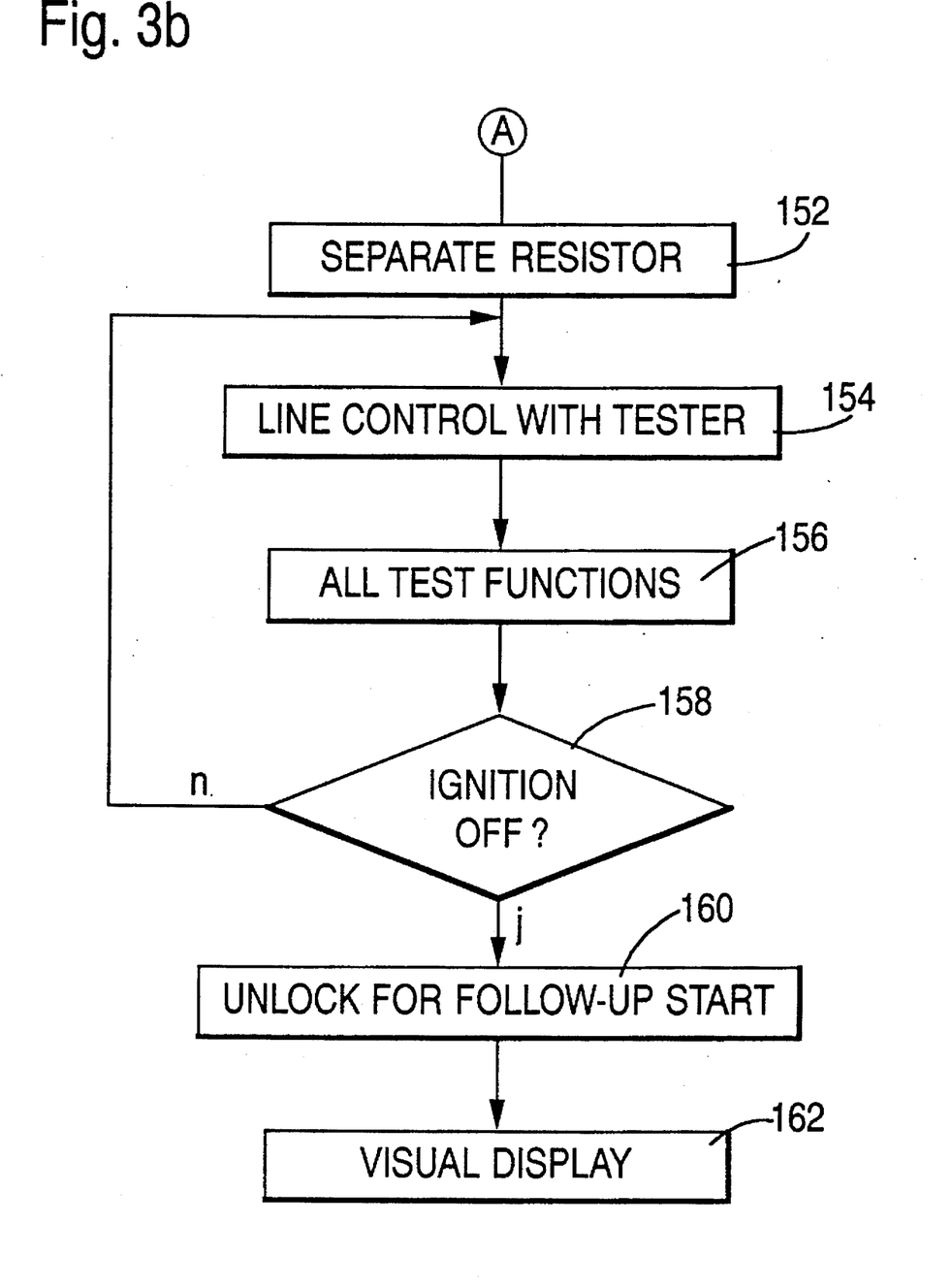

First, FIG. 3 shows the individual measures in the central anti-theft controller 2.

Initially, a vehicle to be secured is in the resting state. If a code carrier 6 is inserted into the reading unit 5 from this position, step 100, the reading unit sends a signal via data line 9 to the anti-theft controller 2, which then resets to a defined initial position, step 102. The resetting in the beginning of the unlocking process also ensures that the vehicle cannot be put into operation even if in the anti-theft controller an information indicating correct unlocking was produced based on appropriate manipulation before start-up. In one variant, the resetting may be triggered by the rise in supply voltage after turning on the ignition. After resetting is complete, the anti-theft controller 2 checks, step 104, whether an unlocking information indicating that the vehicle security system has been properly unlocked is present in a permanent memory, advisably provided in circuit 29, configured as a permanent RAM or an EEPROM. In the following it is assumed that the unlocking information is provided by the setting of an unlocking bit. It is normally not set, which means that the anti-theft controller 2 initially blocks the engine starter in step 106. Subsequently, step 108, the anti-theft controller checks the start-up authorization of the user handling the code carrier 6. This is usually done by comparing the code provided on the code carrier 6 with a code previously stored in the reading unit 5 or in the anti-theft controller. If the result of the start-up authorization check is negative, the anti-theft controller 2 produces a signal leading to the locking of the function controller 3, advisably in step 107. If the result of the start-up authorization check is positive, the anti-theft controller 2 unlocks itself, step 110, and subsequently releases the starter, step 112.

If the anti-theft controller 2 determines in step 104 that the unlocking bit was set, it immediately releases the starter temporarily, step 112. In a variant it may be provided that the starter is only released after a time delay within which complete unlocking may take place.

The temporary release of the starter is followed by a data exchange for unlocking the engine controller 3. For this purpose, the anti-theft controller 2 first forms an unlocking base code Z in step 114, preferably in the form of a random number. From this, it further derives an unlocking code Y preferably by applying a previously stored algorithm to the base code Z.

Furthermore, the anti-theft controller 2 examines, step 116, whether the ignition has been turned on in a simple manner by examining whether ignition contact was made. If the ignition has been turned on, the anti-theft controller 2 sends the codes Z and Y to the function controller 3 in step 118. In the subsequent step 120, it checks whether a stimulation on the data line 1 by an external device 4 is present. Normally, such a signal is not present. The anti-theft controller 2 then checks in step 122 whether the function controller 3 has sent back an acknowledgement signal indicating correct unlocking. If an acknowledgement signal is present, it sets the unlocking bit in step 124. The correct start-up of the vehicle which thus occurred is advisably indicated to the user, e.g., by turning off a control lamp in step 126 that has been lit during the unlocking phase.

For the duration of the vehicle operation thus released, the central anti-theft controller 2 cyclically examines, step 128, whether a stimulation by an external device 4 is present on the data line 1. If such a signal is not present, the central anti-theft controller examines in step 130 whether a signal is present indicating the end of the vehicle operation, particularly by the user having turned off the ignition. If the result of this check is negative, i.e., if the operation of the vehicle is to be continued, steps 124 to 130 are repeated cyclically.

If the result of the check in step 130 is positive, i.e., if a signal is present indicating the end of the operation of the vehicle, the anti-theft controller 2 starts a counter which defines a tracking time window by counting up to a predetermined value. Its magnitude advisably is approx. 1 to 3 seconds. The anti-theft controller then checks in step 132 whether the ignition has been turned on again. If the result is negative, it checks in step 134, whether the tracking time, i.e., the previously started time window, has already expired. If this has not happened yet, steps 132 and 134 are repeated. If the time window has expired, the anti-theft controller 2 locks itself in step 136, while the unlocking bit is reset. Advisably, this state is again visually indicated to the user, e. g., by a control lamp disposed in the vehicle, which, e. g., flashes slowly. In this case the vehicle is immobilized and locked, as prescribed.

If the result of the check in step 132 is positive, which is the case, e.g., if the ignition has been turned on again within the time frame preset by the time window, but also especially if during the operation of the vehicle a short-term power supply failure has occurred, the anti-theft controller 2 repeats the steps 118 et seq.

Simultaneously to sending the codes Z and Y to the function controller 3 in step 118, the anti-theft controller 2 starts a further time window, which advisably amounts to 5 to 20 seconds. If an acknowledgement signal from the function controller 3 is not yet present in step 122, the anti-theft controller 2 checks in the next step 123, whether the time window started in step 118 has already expired. If this is not the case, the anti-theft controller repeats steps 118 to 123. If the time window has expired, this is indicated to the user, advisably again in a visual manner, e. g., by a lamp disposed in the vehicle which, e.g., flashes quickly. In step 127, the anti-theft controller 2 checks whether the ignition has been turned off. If the result of this check is negative, i.e., if the ignition is still turned on, the anti-theft controller repeats steps 125 and 127 until the ignition is turned off. Subsequently it locks itself in step 129.

In the following, the functioning of the vehicle security system is explained for a situation where an external device 4, assuming in the following that it is an engine tester, is connected to the data line 1.

Physically, the connection of an engine tester 4 means the establishment of a low-resistance connection of the data line 1, 1' to the battery voltage $U_B$ parallel to the one existing in the anti-theft controller 2. This may lead to undefined signals and thus to malfunctions on the data line 1, 1' with regard to the communication taking place on it. Therefore, the unlocking communication must be completed before the control function over the data line 1, 1' can be assumed by an external device. If the anti-theft controller 2 finds in step 120 that, before an acknowledgement signal has been received from the function controller 3, an external device 4 was connected to the data line 1, 1' which produces a stimulation signal on the data line 1, 1' it separates resistor 21 by means of a switch 23 from the battery voltage $U_B$, ends the communication with the function controller 3 and transfers the control function over the data line 1 to the engine tester 4, step 140. Since, in this case, unlocking has not been completed as prescribed, the functionality of the anti-theft controller 2 advisably is only available, however, to a limited extent, e.g., for reading out error memories, step 144. Since unlocking has not been completed correctly, the steps 125 to 129 are subsequently carried out.

In order to avoid malfunctions and/or conflicting messages on the data line 1, 1', the external device 4 initiates the assumption of the control of communications on data line 1 advisably immediately after its connection to the data line 1. For this purpose, it feeds a stimulation signal to the data line 1, with the signal being recognized by the anti-theft controller 2 and the function controller 3.

If the data line only consists of a K-line and if the data exchange via the data line 1, 1' meets the requirements of ISO standard 9141, the stimulation signal advisably consists of a 200 millisecond long low-level signal corresponding to a stimulation with 5 Baud.

If the data line 1 consists of a K-line and an L-line according to ISO standard 9141, the stimulation occurs on both lines. The anti-theft controller 2 then recognizes the stimulation on the L-line by the external device 4 and carries out the following steps.

If the anti-theft controller 2 only finds that a stimulation by an engine tester or another external device 4 is present after the establishment of the communication with the function controller 3 has been completed as prescribed in step 128, it separates the resistor 21 in step 152 by means of switch 23 from the battery voltage $U_B$ and transfers the control of the data exchange on the data line 1, 1' to the engine tester 4, step 154.

Since the tester stimulation now occurred after correct unlocking, all tester functions are available, step 156. During the tester operation, the anti-theft controller 2 continuously checks in step 158 if the ignition has been turned off. As long as this is not the case, the tester function is maintained. If the check finds that the ignition has been turned off, the anti-theft controller 2 sets the unlocking bit in step 160 in order to allow a one-time start-up of the vehicle or a limited number of repeated start-ups without an authorization check, e.g., three times. This is necessary, e. g., if start-up processes are to be checked in a repair shop where, from the time when the ignition is turned on, signals are read out via the engine tester 4. Again, advisably the setting of the unlocking bit is visually indicated to the driver, preferably by a lamp in step 162.

Figure 4:
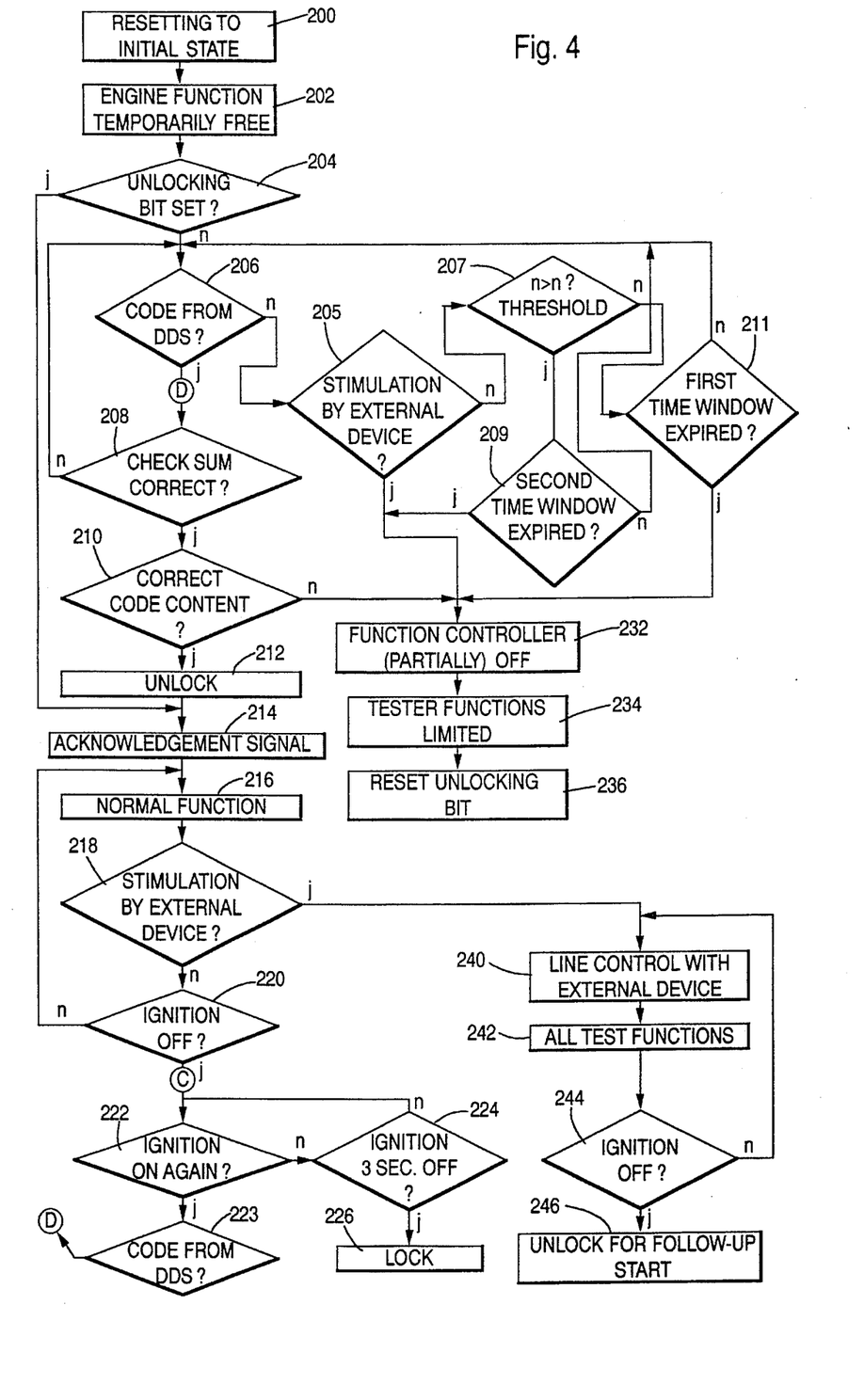
FIG. 4 shows the corresponding function mode of the function controller in the form of a flow chart.

FIG. 4 shows the sequences in the function controller 3 corresponding to the sequences in the anti-theft controller 2, again in the form of a flow chart.

When the ignition is turned on, generally implemented by closing a contact, a corresponding signal is sent to the function controller 3. Subsequently, the function controller 3 first resets itself in step 200 to a predetermined initial state. In step 202, the function controller temporarily releases the engine control function, e.g., the injection control function. In the subsequent step 204 it checks whether an unlocking bit has been set in a permanent memory, which, again, is advisably configured as a permanent RAM or EEPROM. Normally, this is not the case. In the next step, 206, it is checked whether the anti-theft controller 2 has received an unlocking code consisting of the codes Z and Y formed in step 114. If an unlocking code has been received, which is the case if correct unlocking has taken place with the provided code carrier 6, its correct transfer is first ensured via check sum check, step 208, subsequently the code is checked as to its correct content, step 210. For this purpose, the function controller 3 forms a derivative code Y' from the base code Z that was sent, in the same manner as the anti-theft controller 2, i.e., preferably with an algorithm matching the one used in the anti-theft controller 2, and compares code Y' with the base code Y which was sent. If both codes Y, Y' agree, start-up of the vehicle is permissible. In this case function controller 3 unlocks itself in step 212 and sends an acknowledgement signal to the anti-theft controller 2 in step 214. Simultaneously, it stores an information indicating the unlocking state, preferably redundantly, in a permanent memory contained in the function controller 3. In the case of this embodiment it is assumed that, for this purpose, analogous to the anti-theft controller in step 124, an unlocking bit is set in step 214. The vehicle is now operated in normal function, step 216. It has ben unlocked as prescribed.

Simultaneously with the check in step 206, the function controller 3 starts a counter which defines a time window by counting up to a predetermined number. The counter may also be started earlier, e.g., in step 202. It is the purpose of the time window to prevent an unauthorized user from having sufficient time to manipulate the vehicle security system.

If the check in step 206 or 208 finds that a code has not been received or that the check sum is incorrect, the function controller 3 checks in step 205 whether a stimulation by an engine tester 4 is present. If this is not the case, the function controller checks in step 207 whether the engine has exceeded a predetermined speed threshold. The speed threshold preferably corresponds to the so-called starting speed, i.e., a characteristic speed, which the engine should have reached at the end of the start-up phase. Here, the function controller 3 simultaneously starts a further counter, which defines a second time window by counting up to a predetermined number. The length of the time window, e.g., one second, is selected such that an unauthorized user cannot move the vehicle over a great distance by actuating the starter. Once the engine has reached the speed threshold, the function controller 3 checks in step 209 whether the second time window started in step 207 has expired. As long as this is not the case, the steps 206, 205, 207 and 209 are repeated. If malfunctions occur during engine start-up and if the engine therefore does not reach the speed threshold, it is checked, while the engine is stalling, whether the first larger time window, of e. g, 3 seconds, has expired, step 211. If this is not the case, the steps 206, 205, 207, 211 are repeated. One possibility of implementing the two time windows of steps 209 and 211 with a counter is to only allow the first time window to run as long as the engine speed is at the 0 level. Once the speed becomes greater than 0, or if certain changes in the onboard power supply are identified, the counter is restarted each time.

If the check in step 205 finds that a stimulation by an engine starter 4 is present, the function controller 3 shuts off is functions entirely or partially, step 232, so that also the engine tester functions may be available only to a limited extent, step 234. It also resets the unlocking bit in step 236 and stores a corresponding status message in a permanent memory which can, e.g., be read out via an engine tester.

Also, with the implementation of steps 232 to 236, the function controller 3 reacts, if the check in step 209 or 211 shows that one of the time windows set in step 205 has expired or if an incorrect code was present in step 210. In these cases, it must be assumed that an attempt to use the vehicle without authorization is made, advisably a corresponding status message is again recorded in the permanent memory.

If the function controller 3 finds in step 218 that a stimulation by an engine tester is applied to the data line 1, 1', it carries out steps 240 to 244 which correspond to steps 154 to 158 carried out by the anti-theft controller 2. If it finds in step 244 that the ignition has been turned off, it sets an unlocking bit analogous to step 160, step 246, which allows a one-time start-up of the vehicle or a repeated start-up according to a predetermined number without an authorization check. If the check in step 204 finds that an unlocking bit was set, the function controller 3 immediately implements step 214 and sends an acknowledgement signal to the anti-theft controller 2. To end normal operation, steps 220, 222, 224 and 226 follow, which correspond to steps 130 to 136 in FIG. 3. If the controller 3 finds in step 222 that the ignition has been turned on again within the predetermined time window, whose magnitude is, e.g., 2 seconds, it checks whether an unlocking code from the anti-theft controller 2 is present, step 223. If this is not the case, it continues with step 224 and checks whether the time window has expired. Correspondingly, it then locks itself afterwards, step 226, or repeats step 222. If, however, an unlocking code is present, it continues with step 208 et seq.

In order to also make sure that locking cannot take place during the operation of the vehicle due to a malfunction, an additional check can be provided for before the implementation of step 232 to determine if the engine speed is below a predetermined limit value. Locking only takes place if this is the case, otherwise the function is maintained.

An advantageous modification of the system described on the basis of FIGS. 3 and 4 is to complement the shutdown routine in accordance with the steps 132, 134, 136 in FIG. 3 or 222 to 226 in FIG. 4 by measures for the diagnosis of the data line 1. Such a complement is shown in FIG. 5 for the anti-theft controller side 2, in FIG. 6 for the function controller side 3.

Figure 5:
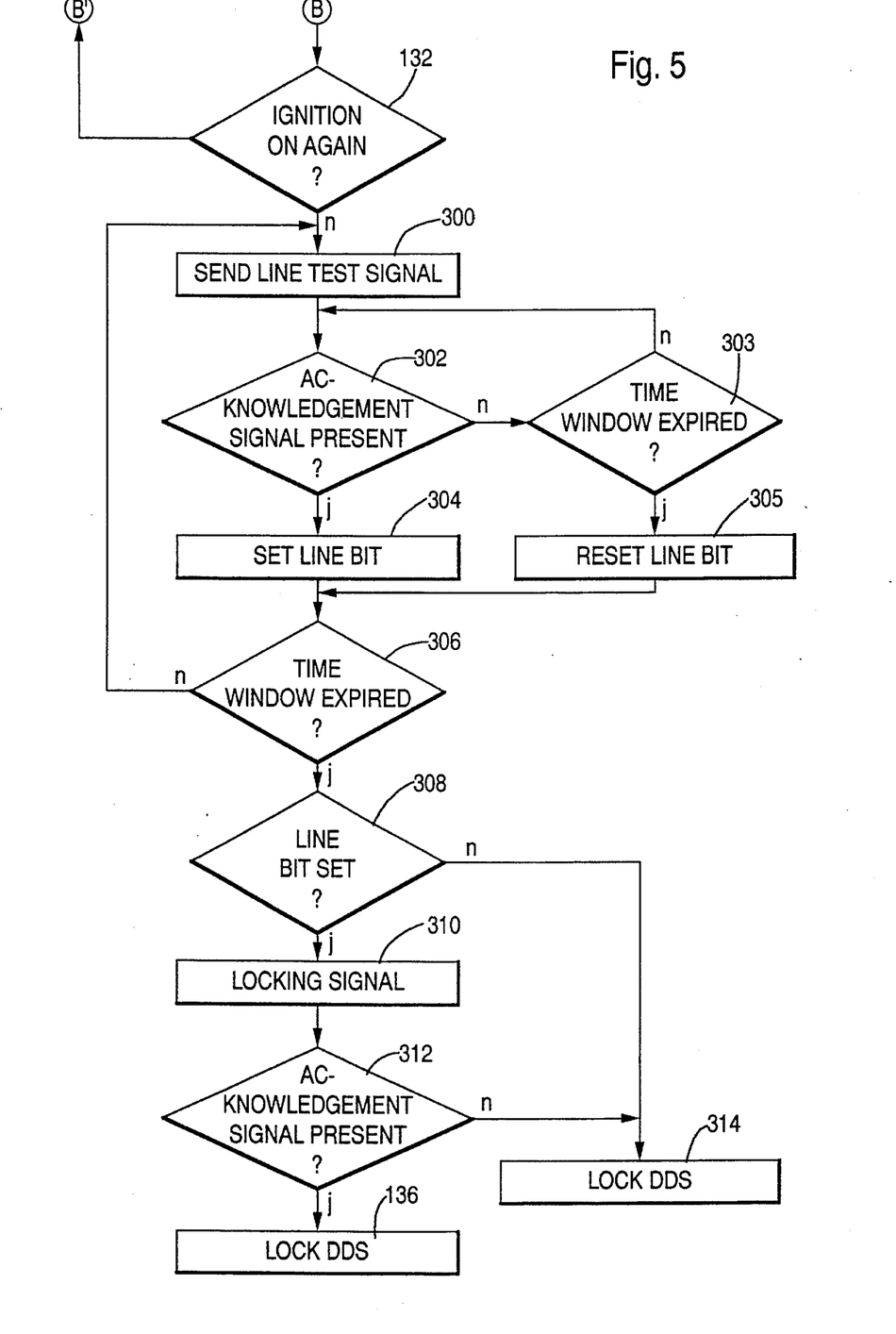
FIGS. 5, 6 and 7 show variants of the function modes shown in FIG. 3 or 4.

As can be seen from FIG. 5, immediately after the check in step 130 determining whether the ignition has been turned off, the anti-theft controller 2 sends a line test signal to the function controller 3 for purposes of line diagnostics, step 300. Afterwards, it checks, step 302, if an acknowledgement signal has arrived from the engine controller 3. If this is the case, it sets a line bit in step 304 which indicates that the data line 1 is working properly. Then it checks in step 306 whether the time window set in step 130 has already expired and, as long as this has not occurred, repeats steps 300 to 306.

If the check in step 306 finds that the time window has expired, the next step 308 checks whether the line bit indicating the state of the data line 1 has been set. If this is the case, the anti-theft controller 2 sends a locking signal to the function controller 3 in step 310 and checks in the next step 312 whether an acknowledgement signal from the latter has arrived. If the result of this check is positive, the vehicle operation is ended in step 136 by resetting the unlocking bit and by a visual display with a lamp disposed in the vehicle.

If the anti-theft controller 2 finds in step 302 that an acknowledgement signal for the line test signal is not present, it first checks in step 303 whether a time window, started in step 300 together with sending the line test signal, has expired. If this is not the case, the anti-theft controller first repeats step 302 and afterwards step 303, if necessary.

If the check in step 303 finds that the time window has expired, there is an error in the data line 1. Therefore the anti-theft controller 2 resets the line bit. Subsequently, it carries out step 306. Once the line bit has been reset also after expiration of the time window in step 306, the anti-theft controller 2 locks itself in step 314 following step 308. Advisably, it visually indicates the defective line state to the vehicle user. This may again be done by means of a lamp disposed in the vehicle which flashes in a predetermined manner.

Figure 6:
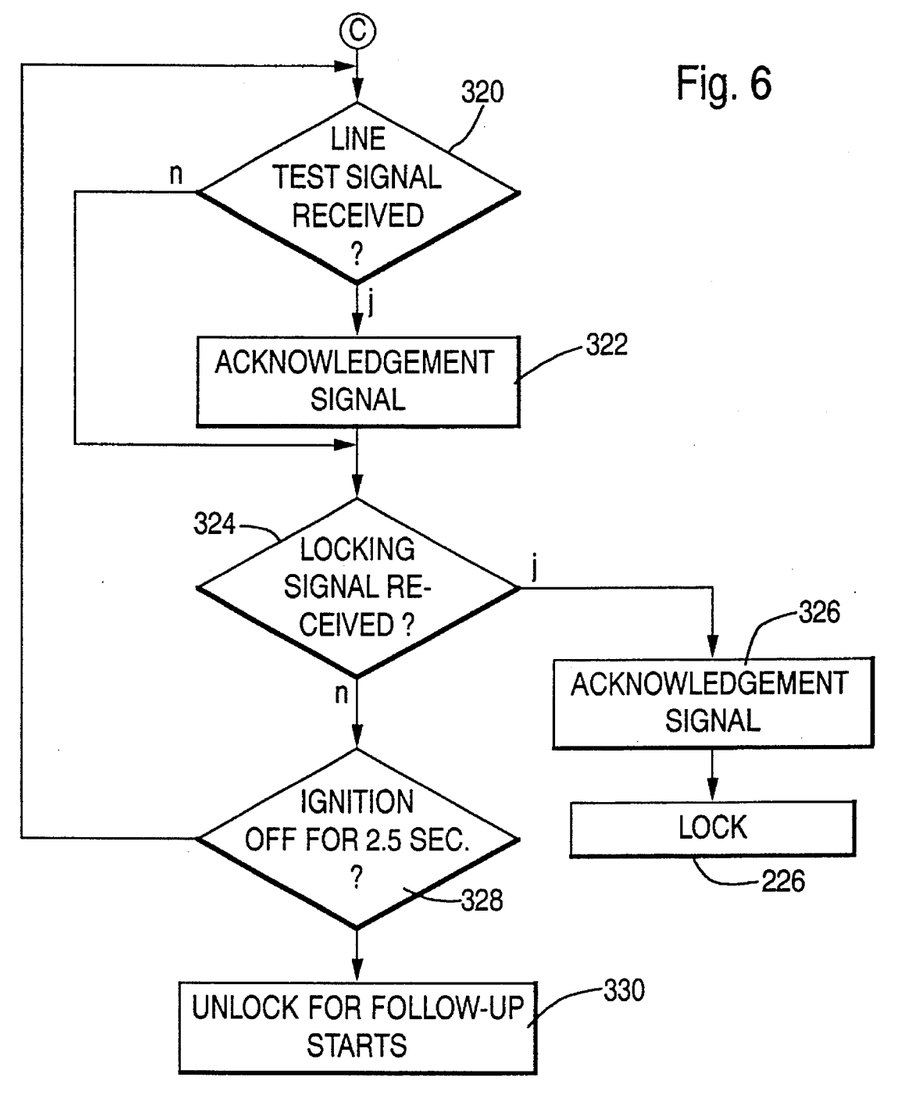

FIG. 6 shows the sequences, corresponding to the flow chart shown in FIG. 5, for the side of the function controller 3. After turning off the ignition in step 220, the function controller first checks in step 320 whether a line test signal has been received from the anti-theft controller 2. If this is the case, the function controller sends an acknowledgement signal, step 322. In the next step, 324, the function controller 3 checks whether a locking signal has been received from the anti-theft controller 2. It also implements this step, if the result of the check in step 320 is negative. If a locking signal has not been received, the function controller checks in step 328 whether a time window started in step 220, whose length advisably is 1 to 3 seconds, has expired and repeats steps 320 to 328 if this is not the case. If the result of the check in step 328 is positive, a line error has occurred. Therefore, the injection controller 3 unlocks itself in step 330 for a predetermined number, e.g., 3, of follow-up starts in order to enable a user to continue operation of the vehicle at least temporarily.

If the check in step 324, however, finds that a locking signal was received, the function controller 3 first sends an acknowledgement signal to the anti-theft controller 2 in step 326 and locks itself in step 226.

A further advantageous modification of the system described on the basis of FIGS. 3 and 4 consists in carrying out a line diagnosis not only after the completion of the normal operation by turning off the ignition but on a continuous basis during the operation of the vehicle. This may be done in a simple manner, e.g., by the anti-theft controller 2, after step 130, carrying out steps 118 and 122 respectively. If, during such a cyclical check, the anti-theft controller finds in step 122 that an acknowledgement signal is no longer present, it assumes that, during the normal operation, an error occurred in the data line 1 or in the function controller 3. In this case, the anti-theft controller 2 stores a corresponding error message in a permanent memory disposed in circuit 29 but does not lock itself. Instead, it still carries out steps 124 et seq. after storing the error message. Advisably, the presence of such an error message is again indicated to the user in a visual manner, preferably by a lamp. The read-out of the error message may take place particularly by an engine tester which is connected as an external device 4 to the data line 1. Corresponding to the cyclical repetition of steps 118 and 122 in the anti-theft controller 2, the function controller 3 cyclically implements the steps 206 to 214 during normal operation following step 220. If one of the checks in the steps 206 to 210 finds that an error has occurred, this, however, does not result in the locking of the function controller 3. Instead, analogous to the anti-theft controller 2, the function controller stores an error message in a permanent memory which can also be read out, e.g., via an engine tester connected to the data line 1 as an external device 4. Analogous to step 330, the function controller advisably unlocks itself if an error has been found during the operation of the vehicle, following previous correct unlocking, for a limited number of follow-up starts to give the user the opportunity, e.g., to take the vehicle to a repair shop.

Figure 7:
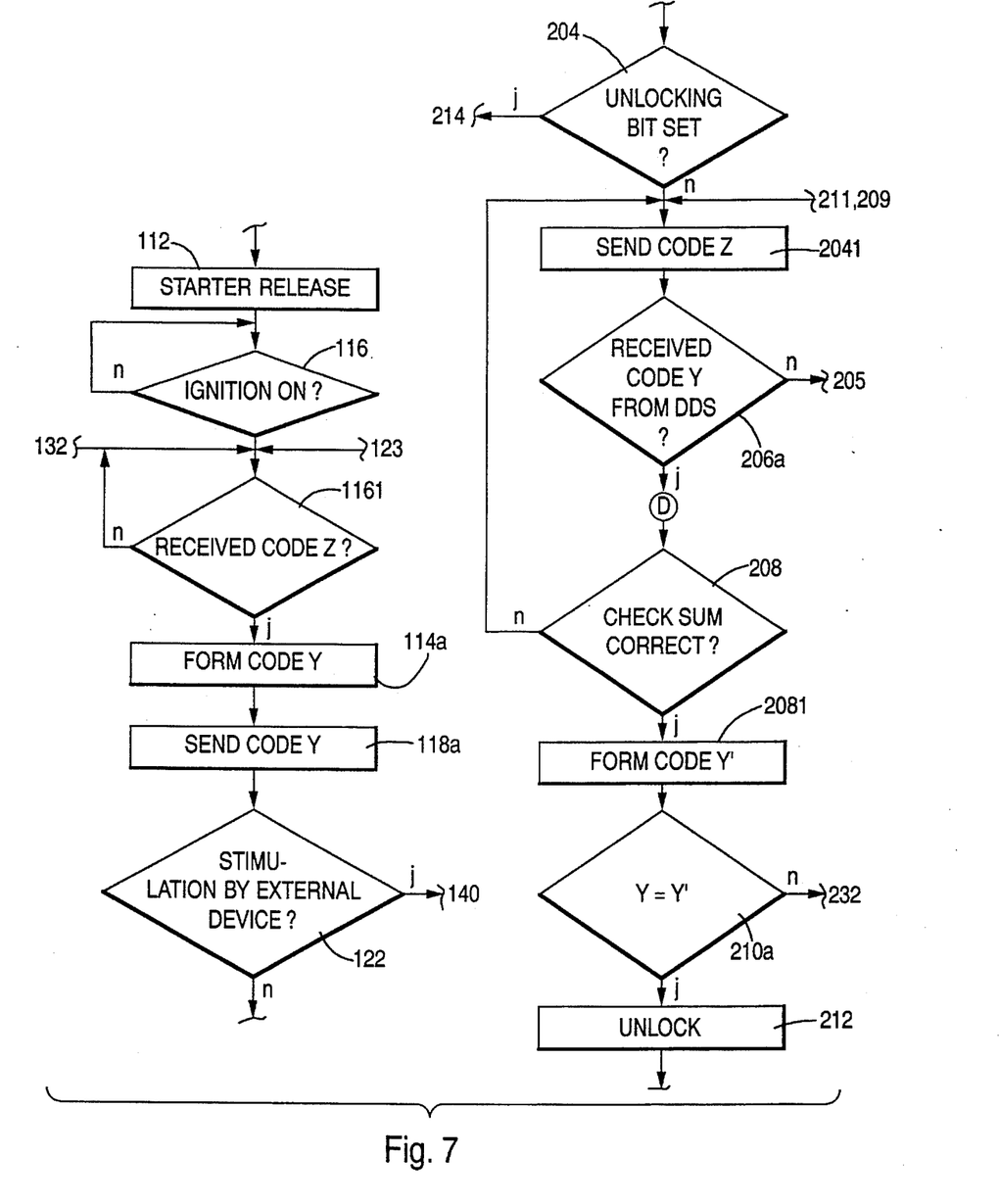

A further advantageous modification of the vehicle security system described above consists in determining the base code Z, in the embodiment of the random number, in the function controller 3 and not in the anti-theft controller 2. This mainly prevents the possibility of an experimental determination of the derivative code Y, e.g., by making many attempts, via an anti-theft controller 2 whose connection to the data line 1 is wrongful. A flow chart of the variant is shown in FIG. 7, for the anti-theft controller in the left half and for the function controller in the right half. Shown are respective excerpts from FIGS. 3 or 5. In such a system where, compared to FIGS. 3 and 4, functionalities have been changed, the base code Z is sent following step 204 from the function controller 3 to the anti-theft controller 2, step 2041. In the latter, step 114 is deleted, instead anti-theft checks in a step 1161 whether the base code Z was received by the function controller 3, if this has happened, it subsequently forms an unlocking code Y from the base code Z in step 114a and, similar to step 118, sends it back to the function controller, step 118a. If a base code Z does not arrive, the query in step 1161 can be repeated in a simple manner. Similarly, more complicated measures can also be provided for this case, such as, e.g., only a limited number of repetitions of step 1161 with subsequent locking. In step 206a the function controller 3 checks whether the unlocking code Y has arrived from the anti-theft controller 2. For this purpose, it advisably forms an unlocking code Y' itself, in the same manner as the anti-theft controller 2, step 2081, and compares this code, similar to step 210, with the received code Y, step 210a.

To further make manipulation of the vehicle security system via the anti-theft controller 2 more difficult, it is also advantageous, especially if only one function controller 3 needs to be unlocked, if it not only carries out the generation of the base code 7 but generally exercises the control function over the data line 1. Here, an additional advantage results with regard to the operativeness of the system if a loss of the information indicating the unlocking state occurs due to a malfunction, in the embodiment of the unlocking bit. In this case, the function controller 3 immediately requests another authorization check so that the unlocking bit can be generated anew.

A further useful modification of the system described above, which can, however, also be used advantageously in combination with many other known vehicle security systems, consists in providing the possibility of inputting an unlocking code by bypassing the anti-theft controller 2, e. g., if an acknowledgement signal from the function controller 3 is not yet present in step 123 after the time window has expired. In this case, the anti-theft controller 2 signals to the user, preferably via a lamp or a display, to manually input a code to unlock the function controller 3 by bypassing the data line 1. This may be done, e.g., through a predetermined actuation sequence of the gas pedal which is then recognized by the function controller 3. Here, the code may be stored in a vehicle-specific manner in a permanent memory contained in the function controller and/or may be accessible to the owner of the vehicle, for instance, by impressing it on the code carrier 6 or by entering it in the vehicle registration certificate. Subsequently, the function controller 3 checks whether the unlocking code has been entered correctly. If this is the case, it sets the unlocking bit and continues afterwards like in normal operation. If it finds, however, that an unlocking code has not been entered or that it has been entered incorrectly, it locks itself in accordance with steps 232 to 236. The possibility of manually inputting the unlocking code allows for a vehicle to also be taken into operation if the data line 1 between the anti-theft controller 2 and the function controller 3 is damaged. This, however, increases the risk of manipulation. In order to counter this risk it is useful to allow for the input of the unlocking code by bypassing the data line 1 only if, previously, in an operational state after prescribed unlocking within the framework of a line diagnosis, an error state has been found and a corresponding information has been stored. At the present time, the ISO standard 9141 which is relevant for the object of the invention described above is under revision. Accordingly, the use of a 25 millisecond long low-level signal followed by a 5 millisecond long high-level signal with an addressing corresponding to the band rate of the data exchange (10.4 K band) is intended to be possible as a proposed stimulation signal by means of which the external device 4 effects a transfer of the control functions from the anti-theft controller 2 to itself. Others, e.g., application protocols, begin without a long low-level signal. If, for instance, the unlocking communication is started in accordance with a, e.g., low-level signal of 40 millisecond duration with a subsequent 10 millisecond long high-level signal this can be differentiated clearly from all other types of protocols.

While maintaining the basic idea on which the afore-described security system is based, a great number of configurations is possible. Many of the individual measures are particularly not limited to the case where a line which already exists for other purposes is used as data line 1 to implement the data exchange regarding the vehicle security system. Thus, it is generally useful for security systems that are based on carrying out an authorization check according to 108 to 122 to ensure that an unlimited data exchange between the controllers connected by a joint data line and an external device is only possible if these have first been unlocked in the authorization check.

The proposed principle for the implementation of the authorization check, according to which the controller 2, 3, 3', 3" exercising the control function sends a base code Z and, derived from it, an unlocking code Y to another controller 2, 3, 3', 3" which generates an unlocking code Y' from the base code, in the same manner as the sending controller, and subsequently compares both codes Y, Y', can also be used in many other security systems that are based on a data exchange between two controllers for an authorization check. Furthermore, the proposed concepts of a line test through cyclical implementation of the authorization check during vehicle operation or through an exchange of a line test signal 300, 322 with another controller connected to the line to be checked in a tracking phase after the ignition has been turned off 130, can also be transferred advantageously to other known security systems that are not based on the use of the K-line and/or L-line.

What is claimed is:

1. Security system for a vehicle comprising: a data line; an anti-theft controller and a function controller each connected to said data line; said anti-theft controller including means for conducting a data exchange with said function controller via said data line to control the operational readiness of said function controller; one of said anti-theft controller and said function controller connected via said data line including means for exercising the function of a control unit to conduct the data exchange via the data line; an interface for said data line for connecting an external device, which is configured for the exchange of data with one of said anti-theft and function controllers connected via said data line, to said data line; said means for exercising the function of a control unit of one of said anti-theft and function controllers, continuously examining said data line to receive and determine whether a request signal from an external device connected to said data line via said interface was transmitted on said data line, and for transferring the control function for conducting the data exchange via the data line to the external device when a request signal from an external device is received.

2. Security system according to claim 1, characterized said external device (4) can only conduct an unlimited data exchange with the controllers if at least one function controller (3, 3' 3") is unlocked after completion of a data exchange for an authorization check.

3. Security system according to claim 1, wherein the one of said anti-theft and function controllers exercising the function of the control unit recognizes the presence of an external device by receiving a predetermined stimulation signal which the external device feeds into said data line after having been connected to said data line.

4. Security system according to claim 3, wherein said anti-theft controller includes said means for exercising the function of a control unit with said means being is provided with a switch which, after recognition of a stimulation signal fed into the data line by an external device, separates a device for control of the data exchange via the data line from the data line.

5. Security system according to claim 1, wherein said anti-theft controller includes said means for exercising the function of a control unit and includes means for, after recognizing the connection of an external device to said data line, storing a signal which permits subsequently starting the vehicle at least once without conducting a data exchange for an authorization check.

6. Vehicle security system according to claim 1, wherein the one of said anti-theft and function controllers (2, 3, 3', 3") exercising the function of the control unit includes means for monitoring the operativeness of said data line by sending a line monitoring signal to at least one other controller after the vehicle ignition has been turned off and by checking the arrival of an acknowledgement signal.

7. A method of carrying out an authorization check in a security system for a vehicle having an anti-theft controller which conducts a data exchange with at least one function controller, particularly an engine controller, in order to control operational readiness of the function controller, and having a data line connecting at least the anti-theft controller and the function controller, and through which the data exchange is carried out; said method comprising: conducting a data exchange between the anti-theft controller and a function controller for an authorization check by: causing one of the anti-theft controller and the function controller to send a base code (Z) to the other of the anti-theft controller and function controller; in the one of said controller receiving the base code, deriving an unlocking code (Y) from the base code (Z) and sending it back to the one of said controllers which sent the base code; and, in the one of said controllers which sent the base code, checking whether the unlocking code (Y) which is received back agrees with an unlocking code (Y') which the one of said controllers which sent the base code (Z) has formed itself from the base code (Z) in the same manner as the one of said controllers receiving the base code (Z).

8. The method according to claim 7, wherein one of the controllers exercises the function of a control unit; and further comprising causing the controller exercising the function of a control unit to monitor the signal line by cyclically conducting an authorization check during operation of the vehicle.

* * * * *